March 4, 1958  J. W. THOMAS  2,825,463
THERMAL DIFFUSION APPARATUS
Filed Dec. 31, 1954  8 Sheets-Sheet 1

FIG. 1.

INVENTOR.
JOHN W. THOMAS
BY Leland L. Chapman
ATTORNEY

March 4, 1958  J. W. THOMAS  2,825,463
THERMAL DIFFUSION APPARATUS
Filed Dec. 31, 1954  8 Sheets-Sheet 2

INVENTOR.
JOHN W. THOMAS

INVENTOR.
JOHN W. THOMAS
BY
*Leland L. Chapman*
ATTORNEY

March 4, 1958  J. W. THOMAS  2,825,463
THERMAL DIFFUSION APPARATUS
Filed Dec. 31, 1954  8 Sheets-Sheet 6

INVENTOR.
JOHN W. THOMAS
BY
ATTORNEY

INVENTOR.
JOHN W. THOMAS

United States Patent Office

2,825,463
Patented Mar. 4, 1958

2,825,463

THERMAL DIFFUSION APPARATUS

John W. Thomas, Cleveland Heights, Ohio, assignor to The Standard Oil Company, Cleveland, Ohio, a corporation of Ohio Application December 31, 1954, Serial No. 479,119

12 Claims. (Cl. 210—176)

The present invention relates to improvements in apparatus for separating, by thermal diffusion, mixtures that are liquid under the conditions of operation into dissimilar fractions.

It has been known for many years that the imposition of a temperature gradient across a thin film or layer of liquid mixture results in preferentially concentrating a component at the high temperature side of the film and in correspondingly impoverishing the concentration of that component or increasing the concentration of another component at the other side of the film or layer. The phenomenon involved in effecting such differences in concentration is referred to as thermal diffusion.

Various types of apparatus have heretofore been proposed for separating or relatively concentrating one or more of the components of a liquid mixture by thermal diffusion. Thus, for example, U. S. Patent No. 2,541,069 to Jones and Hughes describes a tubular-type apparatus in which a liquid mixture is subjected to thermal diffusion while confined in a narrow annular chamber between concentric tubes as well as a flat plate-type of apparatus in which thermal diffusion is effected while the liquid mixture is confined in a chamber defined by closely spaced, plane wall members. In the tubular-type apparatus the inner tube may be relatively cooled and the outer tube relatively heated, or vice versa, so that a temperature gradient will be imposed across the liquid in the thermal difflusion separation chamber defined by the outer surface of the inner tube and the inner surface of the outer tube.

It has been established that the degree of separation which can be realized with thermal diffusion apparatus of this type is very sensitive to a number of factors. Important among these factors are the feed rate, the uniformity of distribution of the feed across the width or around the periphery of the separation chamber, and the accuracy and uniformity of the spacing between the opposed wall surfaces defining the separation chamber. In a thermal diffusion apparatus designed for the separation of liquid mixtures, the problem of maintaining a substantially uniform spacing between the chamber-forming wall surfaces is particularly acute in view of the requirement that the spacing in question should be within the range of about 0.01 to about 0.15" and preferably between about 0.02 and about 0.06 to 0.08". These requirements for maintaining substantially uniform and accurate spacing between the chamber-forming walls are made more difficult to attain by the fact that the walls themselves are maintained at widely different temperatures in the course of operation although, when the apparatus is assembled or rendered inactive for any reason, the temperature of all parts will be substantially the same.

In apparatus of the multi-tubular type, i. e. one containing a plurality of sets or pairs of concentric tubes each forming an annular thermal diffusion separation chamber, the inner tubes are supported by tube sheets or header members that are subjected to entirely different temperatures than the tube sheets or header members that support the outer tubes. While such apparatus may have the inner tubes aligned perfectly with the outer tubes when all parts of the apparatus are at the same temperature, they may be moved seriously out of alignment, considering the extremely small spacings involved, when the tube sheets or header members supporting the inner tubes are subjected to a considerably different temperature, and therefore to a considerably different degree of expansion or contraction, than the tube sheets or header members supporting the outer tubes. Furthermore, it is apparent that the tubes themselves, upon being subjected to widely different temperatures, will undergo differential expansion or contraction and thus create difficulties in properly supporting them and at the same time keeping the headers communicating with the interiors of the thermal diffusion separation chambers fluid tight.

The present invention is addressed primarily to the solution of problems created by the differential expansion and contraction of the inner and outer tubes and of their support means in a multi-tubular type thermal diffusion apparatus. The invention is further directed to providing suitable means for introducing liquid to be subjected to thermal diffusion into and properly distributing liquid among a plurality of annular separation chambers, distributing the total feed equally to each of the chambers, and distributing this feed uniformly about the periphery of each individual separation chamber.

Broadly, the improved apparatus comprises a plurality of substantially vertical tube sets, each tube set comprising essentially inner and outer concentric tubes forming between them a narrow annular separation chamber. Means such as tube sheets, are provided for supporting the ends of the outer tubes in spaced relation to one another so that a heating or cooling medium may circulate around the tubes. The inner tubes are supported concentrically within the respective outer tubes in a manner that will permit them to expand or contract axially relative to the outer tubes as well as to permit them to adjust their positions laterally to a degree sufficient for maintaining them truly concentric with reference to the respective outer tubes despite lateral movements of said outer tubes resulting from radial or transverse expansion or contraction of the tube sheets supporting the outer tubes. At least two headers are provided for communicating with the upper and lower ends of the annular separation chambers so that liquid may be introduced into and withdrawn from them.

One of the primary advantages of the apparatus of the invention is that its construction takes full cognizance of and permits both radial and longitudinal expansion and contraction of those members subjected to different temperatures in bringing the apparatus into operation and in operating it. When it is considered that it is by no means unusual to maintain one wall of a thermal diffusion separation chamber, referred to herein simply as the hot wall, at a temperature of the order of 500° or 600° F. or even higher and the other wall, referred to herein simply as the cold wall, at an appreciably lower temperature, e. g., room or freezing temperature, it will readily be appreciated that stresses and distortions in major proportions, and disruptions of fluid seals, will occur unless adequate means are provided to compensate for the relative expansion and contraction of adjacent parts.

Other advantages of the apparatus of the invention include the uniformity with which a plurality of separation chambers are supplied with liquid to be subjected to thermal diffusion, the uniformity of distribution of feed about the periphery of the separation chamber for each tube set, the uniformity of temperature of the hot walls on the one hand and of the cold walls on the other, and the ease with which the tubes may be removed or replaced for cleaning and other maintenance operations.

These and other advantages as well as the utility of the apparatus will become further apparent from the following detailed description made with reference to the accompanying drawing, wherein.

Figure 1:
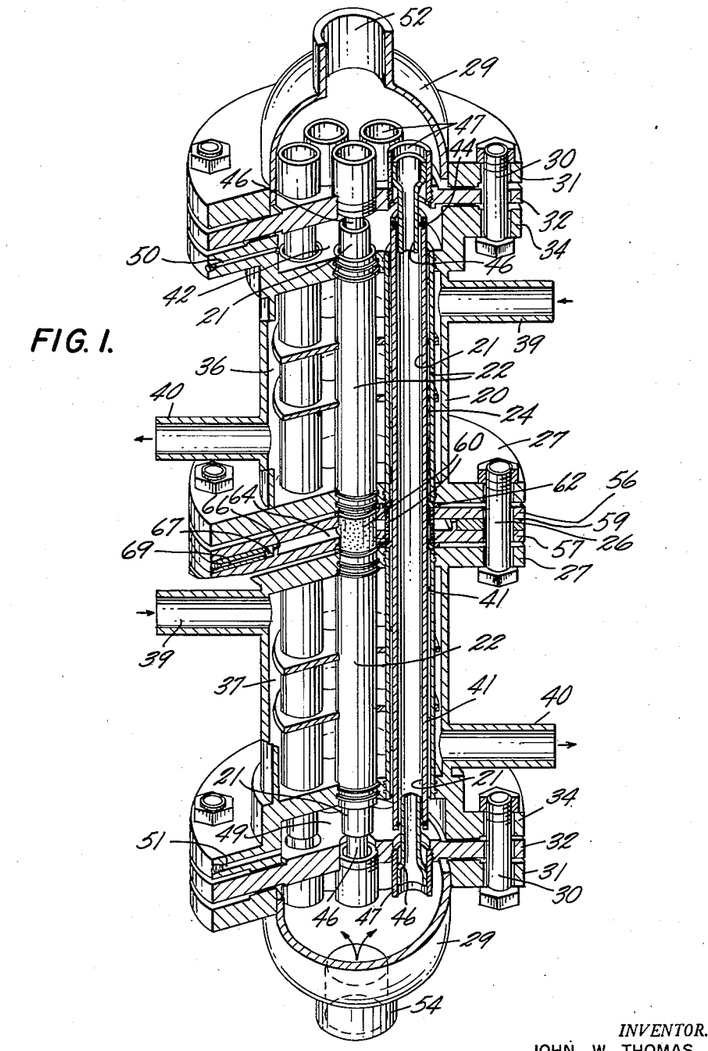
Figure 1 is an isometric view, partly in cross-section, of one preferred embodiment of the apparatus.
Figure 2:
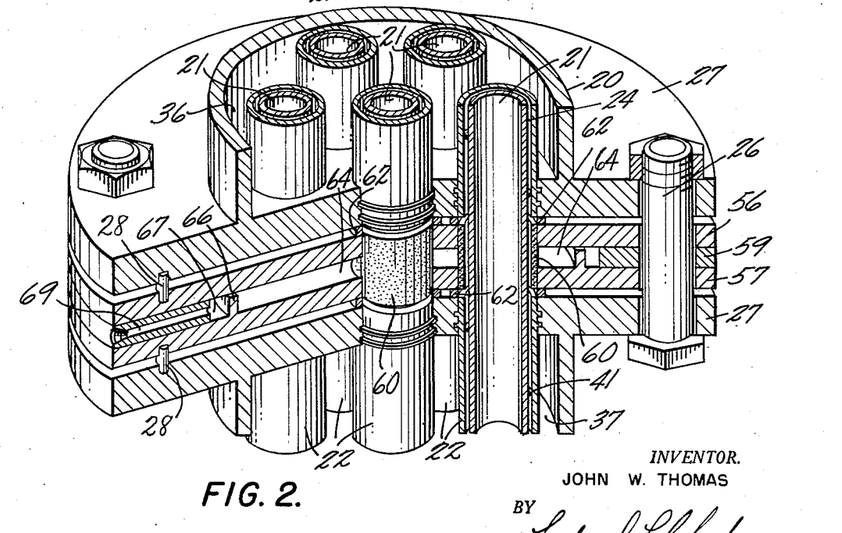
Figure 2 is a view in cross-section, on a larger scale, of the inlet manifold construction of the apparatus illustrated in Figure 1.
Figure 3:
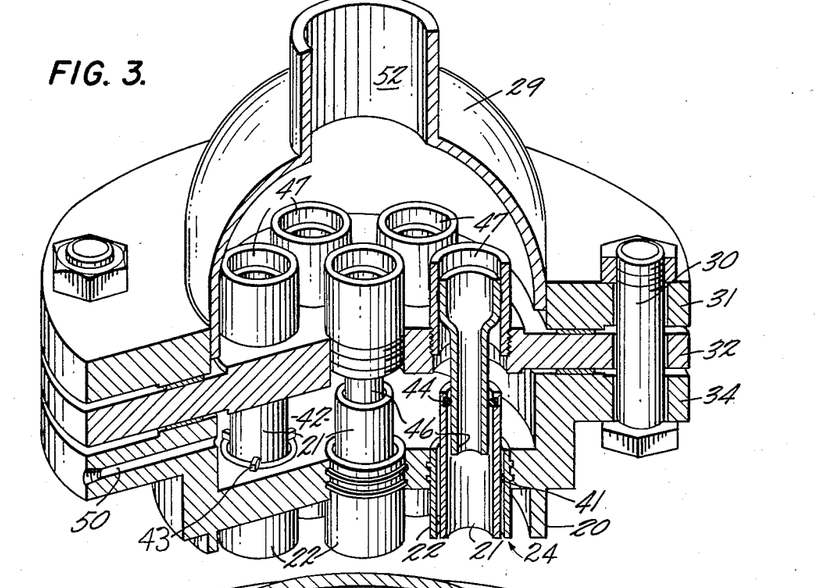
Figure 3 is a similar view of the upper end of the apparatus illustrated in Figure 1.

Referring first to Figures 1, 2 and 3, the apparatus generally includes a shell 20 containing a plurality of tube sets, each set comprising an inner tube 21 concentric within an outer tube 22, the outer and inner surfaces of which are spaced apart a substantially uniform distance for forming a thermal diffusion separation chamber 24. The upper and lower halves of the shell 20 are preferably secured to one another by any suitable means such as bolts 26 and tube sheets 27. In order to facilitate accurate alignment of the tube sets, dowel pins 28 may be employed. The upper and lower ends of the shell are closed by caps 29 secured to the shell by bolts or the like 30 passing through the flanges 31 and tube sheets 32 and 34.

In the embodiment illustrated in Figure 1, the outer tube 22 of each tube set comprises an upper half and a lower half, the upper half extending from the upper tube sheet 27 to the upper tube sheet 34 and the lower half extending from the lower tube sheet 27 to the lower tube sheet 34. The ends of the outer tubes 22 may be rolled into or otherwise secured in fluid-tight manner to the tube sheets 27 and 34 so as to maintain the tubes in spaced relationship and form compartments 36 and 37 through which a heating or cooling fluid can circulate in contact with the outer surfaces of the outer tubes 22. Suitable inlets and outlets for such heating or cooling fluid are provided at 39 and 40.

The inner tubes 21 are maintained concentrically within their respective outer tubes 22 by means of suitable spacers such as buttons 41 or the like, welded or otherwise affixed at intervals around the periphery and along the lengths of the inner tubes 21. The inner tubes are supported by lugs 43 welded or otherwise affixed to the tubes and resting on the ends of the outer tubes as shown in Figure 3. The upper end of the inner tube 21 extends beyond the upper end of the outer tube 22 into an upper product header 42 which communicates with the upper ends of the annular separation chambers 24. Inside the upper end of each inner tube 21 there is provided a gasket 44 for making a fluid-tight seal with a tube segment 46 that fits inside the upper end of the inner tube 21 and is sweated or otherwise secured to a nipple 47 threaded into the tube sheet 32. The lower end of the inner tube 21, which likewise extends beyond the end of the outer tube 22 into a lower product header 49, is similarly connected to the lower tube sheet 32. A passageway 50 is provided in the upper tube sheet 34 for withdrawing fluid from the upper product header 42 and a similar passageway 51 is provided in the lower tube sheet 34 for withdrawing fluid from the lower product header 49. The upper and lower caps 29 are provided with openings 52 and 54 so that heating or cooling fluid may be passed up or down through the inner tubes 21 by way of nipples 47 and tube segments 46.

Between the upper and lower tube sheets 27, as shown best in Figure 2, there is provided a distribution chamber 64 formed by perforated plates 56 and 57 welded to a ring member 59. The perforations in the plates 56 and 57 accommodate feed control elements, one for each tube set, essentially consisting of cylinders 60 of a porous material suitably sealed against leakage by brazing, welding, rolling or the like. The distribution chamber 64 communicates with the thermal diffusion separation chambers 24 through the porous cylinders 60. A fixed flow restricting member in the form of a peripheral barrier member or ledge 66 is provided on the perforated plate 57 to form an annular feed header 67 for the distribution chamber 64. The header 67 communicates with the exterior of the apparatus by means of a passageway 69.

In operation, a mixture of miscible liquids or a solution containing one or more solutes is introduced into the distributor 64 by way of passageway 69, feed header 67 and the restricted passage between the perforated plate 56 and the ledge 66. The liquid passes from the distributor 64 through the porous cylinders 60 into the separation chambers 24 between the inner tubes 21 and the outer tubes 22. A heating fluid such as, for example, "Dowtherm" vapors, a eutectic mixture of diphenyl and diphenyl oxide, may be introduced into the chambers 36 and 37 through inlets 39 and the cooled or condensed vapors may be withdrawn by way of outlets 40 after intimate contact with the exteriors of the outer tubes 22. A cooling fluid such as, for example, water, may be introduced into the lower end of the apparatus by way of inlet 54, enter the inner tubes 21 by way of tube extensions 46 and nipples 47 and pass through the inner tubes 21 to be withdrawn from the apparatus at the top through the outlet 52. While it is preferable to heat the outer tubes 22 and cool the inner tubes 21 in this manner, it is to be understood that it is within the scope of the invention to reverse this procedure by relatively cooling the outer tubes 22 and relatively heating the inner tubes 21.

The liquid within the annular separation chambers 24 is thereupon subjected to thermal diffusion by virtue of the temperature gradient across the chambers. One or more components will tend to become concentrated adjacent the hot wall, i. e., the inner surfaces of the outer tubes 22, and will thereupon ascend by convection and be collected in the upper header 42 for withdrawal to the exterior of the apparatus by way of outlet 50. Another component will tend to accumulate adjacent the cold walls, i. e., the exterior surfaces of the inner tubes 21, and descend by convection for collection in the lower header 49 and withdrawal to the exterior of the apparatus by way of passageway 51.

The porosity of the cylinders 60 is preferably such that the major pressure drop of the liquid from the point of entry to the points of departure will occur during passage of the liquid through these cylindrical elements. In this manner slight differences in pressure drop through the various separation chambers that may occur due to small dimensional differences involved in the annular spacing of the various tube sets will be effectively masked so that the rate of feed into the various chambers will be substantially uniform. The high pressure drop through the cylinders 60 will also promote uniform distribution of feed about the periphery of the cylindrical distributors 60.

When the apparatus is brought into operation and the inner tubes are relatively cooled while the outer tubes are relatively heated, differential expansion will occur both longitudinally and radially or transversely. Ordinarily the longitudinal expansion of the outer tubes 22 of itself presents no problem because the shell 20 is raised to substantially the same relatively high temperature by the heating medium entering through inlets 39 and leaving through outlets 40 as are the outer tubes 22. If any appreciable difference in longitudinal expansion as between the tubes 22 and the shell 20 is anticipated, e. g., if the liquid in the annular chambers 24 has a relatively high thermal conductivity and/or the velocity of flow is large, an expansion joint may be provided in the shell or, as described hereinafter, the tube may be resiliently mounted in the shell. The relatively lesser longitudinal expansion or perhaps even contraction of the inner tubes 21 is compensated for by actual movement between one or both ends of the inner tubes 21 and the tube segments 46. The relatively greater radial expansion of the tube sheets 27 and 34, which come into direct contact with the heating medium in chambers 36 and 37, as compared with the tube sheets 32 for supporting the inner tubes 21, is compensated for by the ability of the tube extensions 46, shown best in Figure 3, to tilt slightly and thereby allow the inner tubes 21 to remain truly concentric with reference to their respective outer tubes 22. The disposition of the sealing ring gaskets 44 between the inner tubes 21 and the tube extensions 46 within the upper and lower headers 42 and 49 at locations remote from tube sheets 34 has the advantage of not exposing these gaskets to the maximum temperature within the apparatus, i. e., the temperature within the chambers 36 and 37 or of the tube sheets 34.

The apparatus is easy to assemble, disassemble and service. After the distribution chamber 64 has been assembled and the outer tubes 22 and shell members 20 have been aligned, if desired by means of dowel pins 28, and bolted together with bolts 26, the inner tubes 21, with gaskets 44 in position, are slipped into place. Tube sheets 32 are then aligned and nipples 47 are screwed in. Finally the caps 29 are bolted on. To clean the apparatus, it is necessary merely to remove the cap 29, nipples 47, header 32 and inner tubes 22 from one end, and to replace these elements after cleaning the interiors of the outer tubes 22.

Referring now to Figures 4, 5, 6 and 7, the apparatus illustrated therein includes a shell 70 enclosing a plurality of tube sets, each comprising an inner tube 71 and an outer tube 72 forming between them an annular thermal diffusion separation chamber 74. The upper and lower portions of the apparatus may, like the apparatus illustrated in Figure 1, be joined by bolts or the like 26 passing through the tube sheets 27, and the upper end of the apparatus may be covered by a cap 29 similar to the caps of the apparatus shown in Figure 1.

Figure 4:
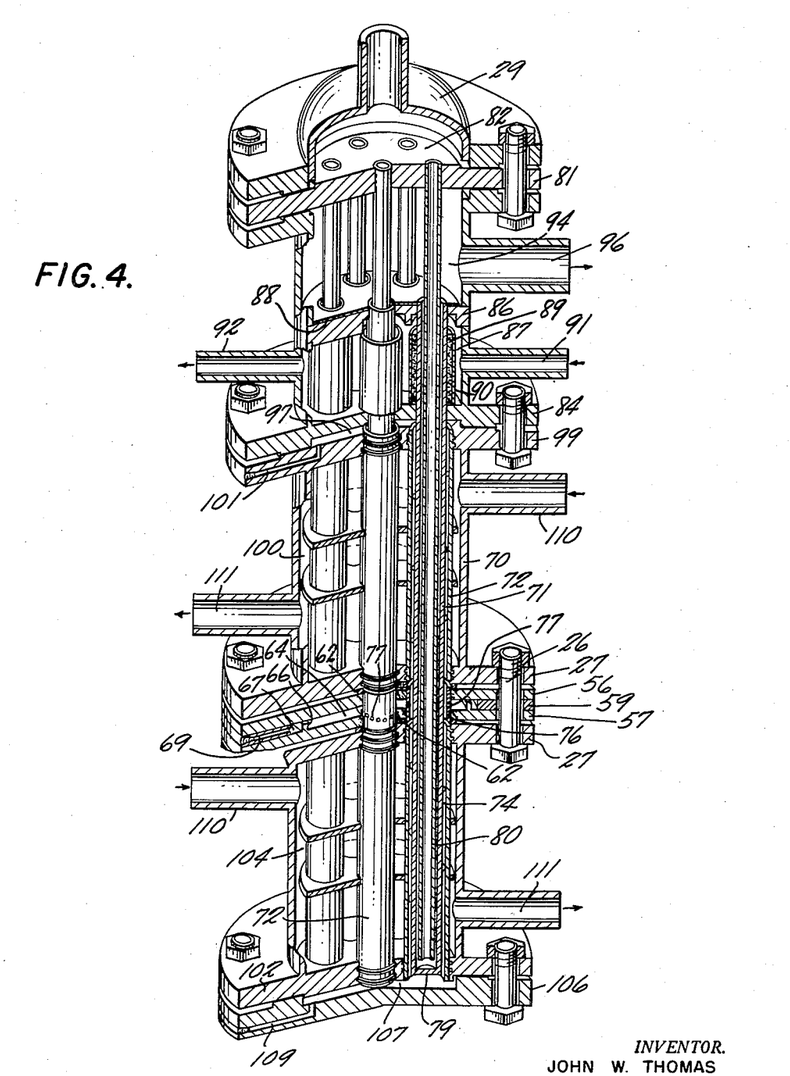
Figure 4 is an isometric view, partly in cross-section, of another preferred embodiment of the apparatus.
Figure 5:
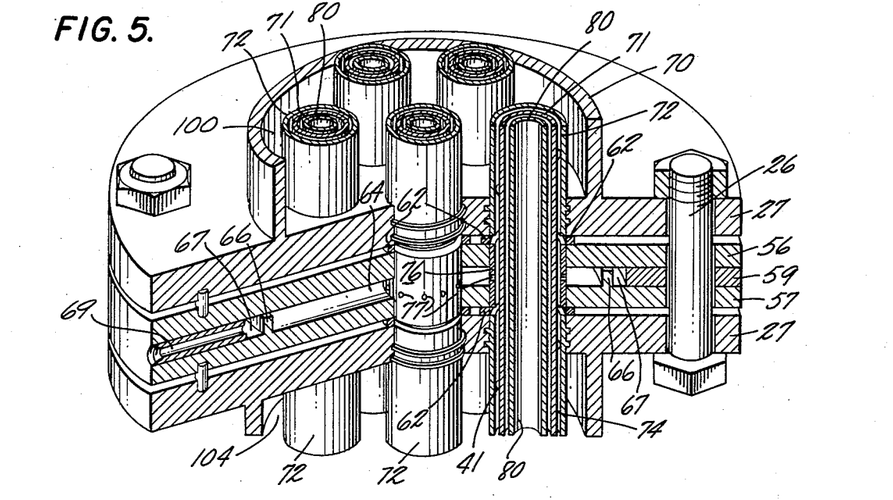
Figure 5 is a view, partly in cross-section, of the inlet manifold of the apparatus illustrated in Figure 4.

The inlet portion of the apparatus illustrated in Figure 4 is substantially similar to that illustrated in Figure 2, in that it comprises a distribution chamber 64 between perforated plates 56 and 57, a feed header 67 separated from but in communication with the distributor 64 by a space between the perforated plate 56 and the top of an annular ledge 66 on plate 57, and a radial passageway 69. In place of the porous cylinders 60 of Figure 2 to equalize the feed to the various separation chambers 74, and to distribute feed equally about the tube periphery, there are however provided cylindrical elements 76 having perforations 77 for communication between the inlet header 64 and the annular separation chambers 74. The sealing gaskets 62 are substantially similar to those shown in Figures 1 and 2.

The main difference between the embodiments illustrated in Figures 1 and 4 is that whereas in Figure 1 the cooling or heating medium for the inner tubes 21 passes through in only one direction, the structure of Figure 4 is such that this medium enters and leaves the inner tubes at the same end. This is accomplished by sealing one end, shown as the lower end in Figure 4, of the inner tube 71 with a seal 79 and suspending within the inner tube 71 a bayonet tube 80. The tube 80 is supported in a tube sheet 81 and communicates with a fluid header 82 under the cap 29. It is open at the lower end within the inner tube 71 so that fluid may ascend between the outer wall of the bayonet tube 80 and the inner surface of the inner tube 71 after descending through the interior of the bayonet tube 80.

The inner tube 71 is supported at its upper end by tube sheets 84 and 86, the latter being provided, if desired, with a layer of insulating material 88. In the chamber 87 formed between the tube sheets 84 and 86, the inner tube 71 of each tube set is surrounded by suitable insulation such as a jacket 89 of glass wool or the like and an auxiliary tube segment 90 and the chamber 87 is provided with a suitable inlet 91 and outlet 92 for heating or cooling fluid. A header 94 formed between tube sheets 81 and 86 communicates with the annular spaces between the bayonet tubes 80 and the inner tubes 71 and is provided with a suitable outlet 96 for fluid issuing therefrom.

A collection chamber 97 which communicates with the upper ends of the separation chambers 74 is formed between tube sheets 84 and 99, the tube sheet 99 in addition serving as a means for supporting the upper ends of the outer tubes 72 in spaced relationship to one another within the chamber 100 formed between the tube sheets 99 and 27. The tube sheet 99 is further provided with a passageway 101 for withdrawing liquid from the collection chamber 97 to the exterior of the apparatus.

The lower ends of the outer tubes 72 are supported in spaced relation to one another by a tube sheet 102, said tube sheet forming, with the lower tube sheet 27 and the lower portion of the shell 70, a chamber 104 and, with a base sheet 106, a collection chamber 107 that communicates with the lower ends of the separation chambers 74. The base sheet 106 is provided with a passageway 109 for withdrawing liquid from the collection chamber 107 to the exterior of the apparatus. Chambers 100 and 104 are, like chambers 36 and 37 of the apparatus illustrated in Figure 1, provided with inlets and outlets 110 and 111 for a heating or cooling medium.

The operation of the embodiment illustrated in Figures 4, 5, 6 and 7 will now be described, assuming that the inner tubes 71 are to be relatively cooled and the outer tubes 72 are to be relatively heated.

A suitable heating medium such as "Dowtherm" vapor is introduced into the chambers 100 and 104 by way of inlets 110 and the cooled vapors or condensate are removed by way of outlets 111 to raise the temperature of the outer tubes 72, forming the hot walls of the annular separation chambers 74, to a desired elevated temperature. A similar heating medium is preferably passed through a chamber 87 by way of inlet 91 and outlet 92. A cooling medium such as water is introduced into the apparatus at the top by way of header 82 and distributed among the bayonet tubes 80 through which it descends until the water reaches the bottom of the tubes 80 and then ascends between the outer surfaces of the bayonet tubes 80 and the inner surfaces of the inner tubes 71 for withdrawal by way of header 94 and outlet 96. This operation has the function of relatively cooling the inner tubes 71 forming the cold walls of the separation chambers 74.

The liquid mixture to be subjected to thermal diffusion is introduced into the inlet header 64 by way of passageway 69, feed header 67 and distributor ledge 66. From the distribution chamber 64 the liquid is distributed substantially uniformly to the annular separation chambers 74 by passage through the holes or perforations 77 in the cylindrical feed control elements 76. Thermal diffusion takes place within the annular chambers 74 in precisely the same manner as described with reference to Figure 1, the hot wall fraction entering the upper header 97 for withdrawal through the passageway 101 and the cold wall fraction entering the lower header 107 for withdrawal through passageway 109.

The difference between the longitudinal expansion of the outer tubes 72 and the relatively lesser longitudinal expansion, or perhaps contraction, of the inner tubes 71 presents no problem in this embodiment because the inner tubes 71 are supported at one end only, the sealed end 79 being able to move freely in an axial direction relative to the corresponding ends of the outer tubes 72. The difficulty of compensating for the difference in radial or lateral expansion or contraction of the tube sheets in supporting the outer tubes 72, which are in contact with the heating medium passing through the chamber 100, and the lesser radial expansion, or perhaps contraction, of tube sheets normally supporting the inner tubes, is compensated for by heating the underside of the tube sheet 86 with the heating medium flowing through chamber 87 and further, if desired, by insulation 88 between the upper side of the tube sheet 86 and the cooling medium flowing through the chamber 94. Suitable insulation such as fiber glass wool 89 and tube sections 90 is provided in the chamber 87 so that the heat of the heating medium passing through the chamber 87 will not be transmitted to the upper ends of the inner tubes 71. The difference in expansion and contraction between the tube sheets 84, 86 and 99 on the one hand, which come into contact with the heating medium, and the tube sheet 81 on the other hand, which comes into contact with the cooling medium and supports the bayonet tubes 80, is of no particular consequence because the bayonet tubes 80 are free enough to adjust themselves within the inner tubes 71 and further because the spacing of the exterior surfaces of the bayonet tubes 80 from the interior surfaces of the inner tubes 71 is not critical, the only requirement being that there should be sufficient space all around to permit substantially uniform movement of the cooling medium along the inner surfaces of the inner tubes 71.

It is to be understood, of course, that the apparatus illustrated in Figures 1 and 4 may readily be modified. The inlet manifolds illustrated in Figures 2 and 5 may, for example, be utilized in the apparatus of Figures 4 and 1, respectively. Furthermore, the apparatus may be modified, e. g., by eliminating the central inlet manifolds or replacing the porous or perforated feed regulating cylinders by impervious cylinders and utilizing the upper or lower header as a feed header in thermal diffusion operations of the type described in the copending application of Jones and Hughes, Serial No. 295,316, filed June 24, 1952 now Patent No. 2,734,633.

Figure 8:
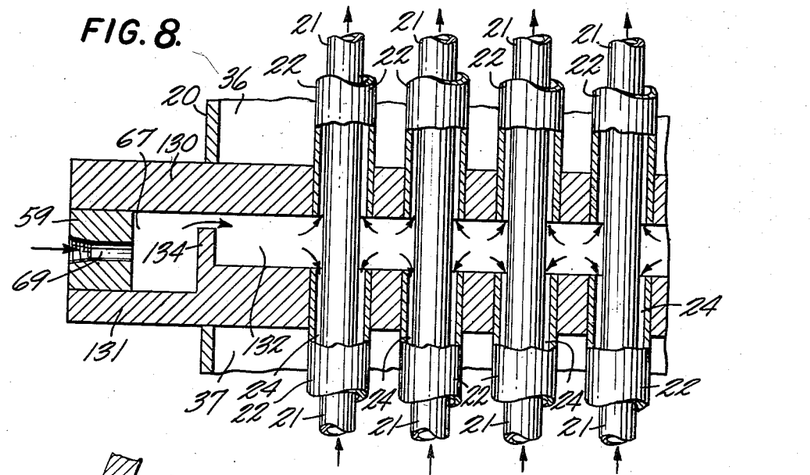
Figure 8 is a view in cross-section, likewise on a larger scale, illustrating an inlet manifold construction that may be employed instead of the one illustrated in Figure 2.
Figure 9:
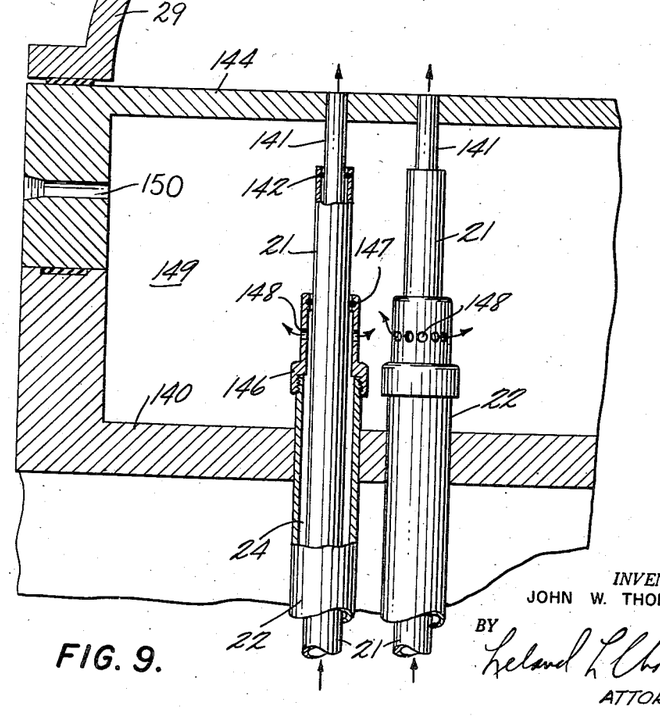
Figures 9 and 10 are fragmentary views in elevation illustrating embodiments alternative to that illustrated in Figure 3 and to be utilized with the inlet manifold illustrated in Figure 8.

Figures 8 and 9 illustrate another embodiment of apparatus for promoting a substantially equal distribution of feed to and among the various annular separation chambers. This embodiment may be employed in apparatus of the type illustrated in Figure 1, the inlet manifold of Figure 8 being substituted for that shown in Figure 2 and the product withdrawal section of Figure 9 being substituted for that shown in Figure 3.

In the embodiment of Figure 8, the tube sheets 130 and 131 perform the functions of supporting the outer tubes 22 in the desired spaced relationship to one another and of forming between them an inlet header 132. In this embodiment the material in the inlet header 132 is permitted to enter the annular separation chambers 24 between the inner tubes 21 and the outer tubes 22 without the necessity of passing through a feed control device such as the porous cylinders 60 or the perforated cylinders 76 of Figures 2 and 5, respectively. The tube sheet 131 is provided with an annular ledge 134 separated from the tube sheet 130 by a ring member 59 provided with a passageway 69 for communication to the exterior of the apparatus.

Figure 10:
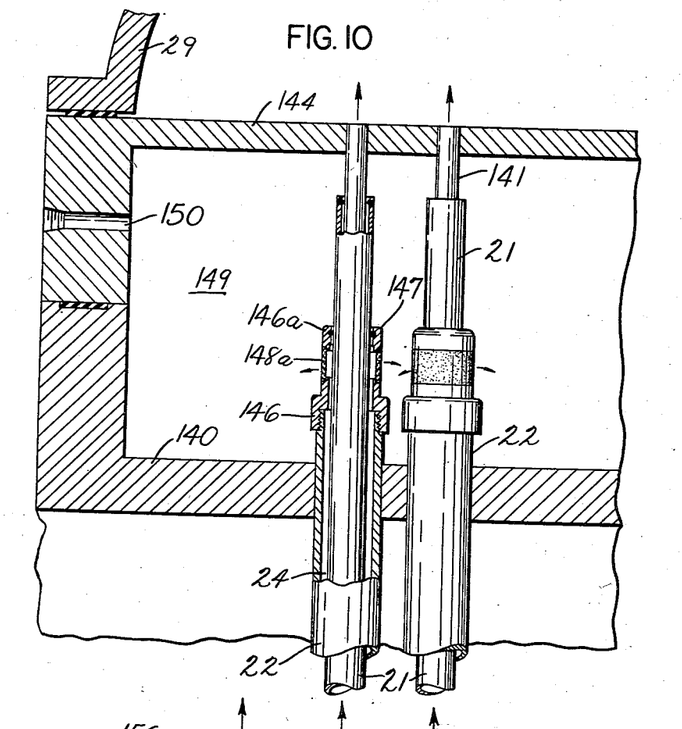

In accordance with the embodiment illustrated in Figure 9, the outer ends of the outer tubes 22 are supported in spaced relation to one another by a tube sheet 140 and the inner tubes 21 are supported, through the medium of tube extensions 141 and ring gaskets 142, by a tube sheet 144. In this embodiment the outer ends of the outer tubes 22 project beyond the tube sheet 140 and are threaded to receive caps 146 sealed to the exteriors of the tubes 21 by ring gaskets 147 and provided with perforations 148 or, as shown in Figure 10, with porous portions 148a, to impose the required pressure drop in the flow path of the fluid so that uniform distribution to each tube set is promoted. It is to be understood, of course, that the structures shown in Figures 9 or 10 may be adopted with equal facility for the lower end of the apparatus illustrated in Figure 1.

In operation, the liquid to be subjected to thermal diffusion is introduced by way of passageway 69 into an annular feed header 67 from whence it passes over the ledge 134 into the inlet header 132 and is thereupon introduced into the separation chambers 24. The fraction that accumulates adjacent the hot walls of the separation chambers 24 and ascends to the top leaves the chambers by way of the perforations 148 or porous section 148a, respectively, enters the header 149 and is withdrawn by means of a passageway 150 in the tube sheet 140. Differences in longitudinal expansion of the outer tubes 22, as compared with the inner tubes 21, are compensated for by the ability of the upper ends of the tubes 21 to move axially relative to the tube sections 141. On the other hand, any differences in radial or transverse expansion as between tube sheets 140 and 144 are absorbed by the flexible connections between the tube sections 141 and the inner tubes 21.

One outstanding advantage of the embodiment shown in Figures 8, 9 and 10 is that all gaskets, i. e. 142 and 147, are located in areas and between surfaces that do not attain the maximum temperatures encountered within the apparatus during operation. This is an important advantage because of limiting temperatures associated with available gasket materials.

Figure 11:
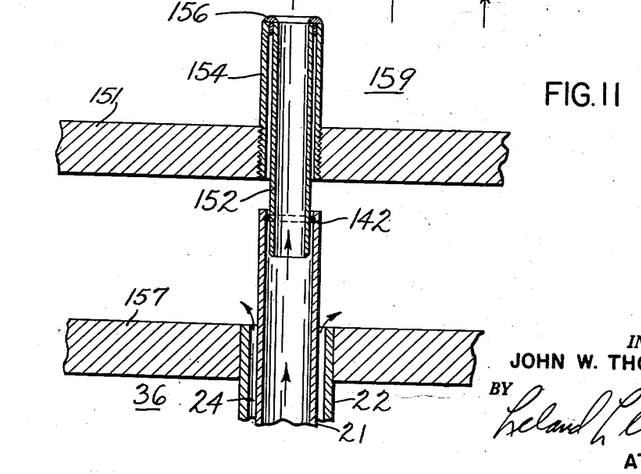
Figures 11 and 12 are fragmentary views in elevation illustrating embodiments alternative to that shown in Figure 3.

Another embodiment of the flexible connection shown in Figure 3 is illustrated in Figure 11, wherein the end of the inner tube 21 is flexibly supported by a cold tube sheet 151 through the medium of a tube extension 152, a nipple 154, a sealing gasket 142 and a sweated or soldered joint 156. In operation, assuming that the outer tubes 22 are relatively heated to form the hot walls and the inner tubes 21 are relatively cooled to form the cold walls, the heating medium will pass through the chamber 36 and in contact with the hot tube sheet 157, whereas the cooling medium will pass through the inner tube 21 and the tube sections 152 into a header 159 and in contact with the cold tube sheet 151. Longitudinal movement of the inner tubes 21 will be taken up by the ring seal 142 and relative transverse displacement of the tube sheets 151 and 157, due to differential expansion or contraction, will be absorbed by the resiliency of the tube segments 152, nipples 154 and joints 156.

This embodiment, which may be used at one or both ends of the apparatus illustrated in Figure 1, has the advantage of locating the sealing gaskets 142 as close as possible to the cold tube sheet and thereby of avoiding the subjection of these gaskets to the high temperatures of the heating medium in the chamber 36 or as reflected in the hot tube sheet 157.

Figure 12:
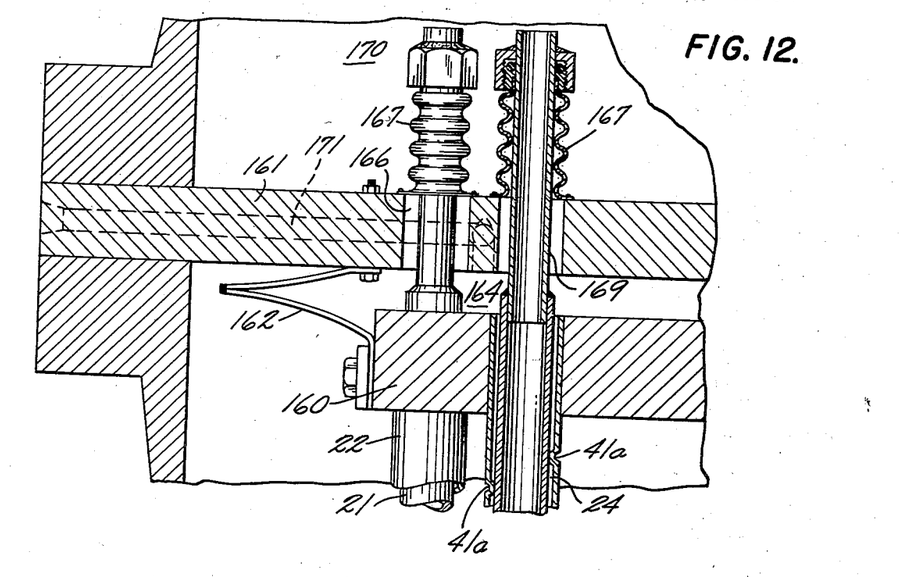

The embodiment illustrated in Figure 12 is another construction designed to compensate for the differences in longitudinal and radial expansion occasioned by subjecting different parts of the apparatus to different temperatures. It can be substituted at both ends, if desired, of the embodiment illustrated in Figure 1 in place of the structure shown in Figure 3. In this embodiment the hot tube sheet 160 is in effect a floating tube sheet secured to the cold tube sheet 161 by an expansion joint 162. The annular separation chambers 24 open into a product header 164 formed between the tube sheets 160 and 161 and sealed from the heating fluid surrounding outer tubes 22 by the expansion joint 162. The inner tubes 21 pass through oversized openings 166 in the tube sheet 161 and expansion bellows 167 are utilized to provide a resilient seal between the tube sheet 161 and the exterior of the inner tubes 21. To permit fitting a maximum number of tubes into a given tube sheet, the ends of the inner tubes 21 may terminate within the product header 164, as shown, and be sealed to tube extensions 169 to which the expansion bellows 167 may be attached.

Figure 12 also illustrates an alternative means for positioning the inner tubes 21 concentrically within the outer tubes 22, the means illustrated comprising dimples 41a pressed into the outer tubes 22 at spaced locations around and along the tubes.

In operation, a heating fluid is passed through a chamber surrounding the outer tubes 22 and cooling fluid is passed through the inner tubes 21 by way of tube extensions 169 which open into a fluid header 170. A fraction separated by thermal diffusion within the annular chambers 24 enters the product header 164 and is withdrawn by way of a passageway 171 through the cold tube sheet 161. Longitudinal expansions of the outer tubes 22 and the shell are readily accommodated by the expansion joint 162. This feature facilitates operation of the unit with a liquid in the separation chamber which has a high thermal conductivity. The longitudinal expansions or contractions of the inner tubes 21 are compensated for by the expansion or contraction of the bellows 167. The radial expansion of the tube sheet 160 relative to the tube sheet which supports the inner tubes 21 is also taken up by the expansion bellows 167 and the inner tubes 21 are thereby permitted to remain truly concentric with respect to the outer tubes 22.

Figure 6:
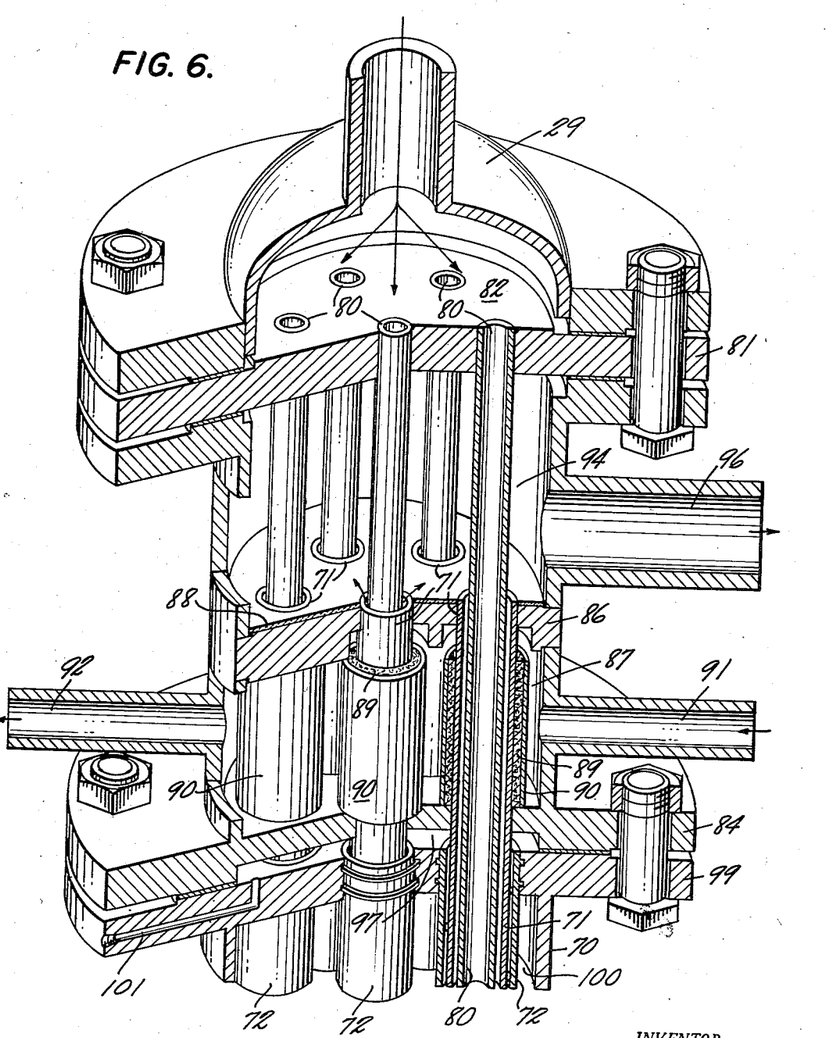
Figure 6 is a similar view of the upper end of the apparatus illustrated in Figure 4.
Figures 13, 14:
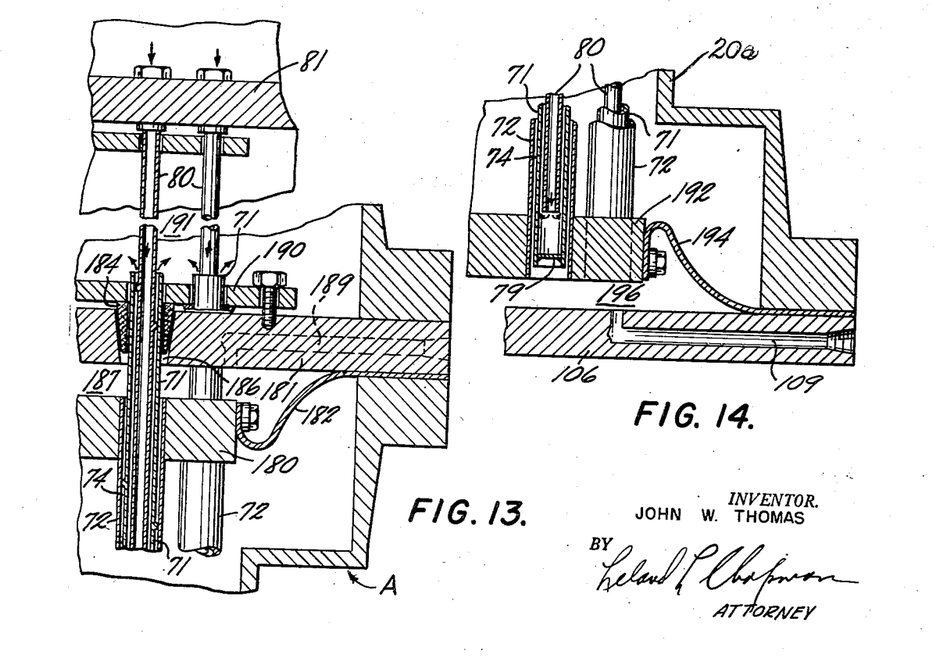
Figures 13 and 14 are fragmentary views, partly in cross-section, illustrating embodiments alternative to those shown in Figures 6 and 7, respectively.

Figure 13 illustrates a construction suitable as an alternative for that illustrated in Figure 6. In this embodiment the outer tubes 72 are supported in a floating hot tube sheet 180 secured to a cold tube sheet 181 by an expansion joint 182. The inner tubes 71 are resiliently and flexibly supported by packings 184 in the tapered and oversized openings 186 of the cold tube sheet 181. The bayonet tubes 80 are supported in a tube sheet 81 in substantially the same manner as illustrated in Figures 4 and 6. The annular separation chamber 74 between the inner tubes 71 and the outer tubes 72 communicate with a product header 187 from which liquid may be withdrawn through a passageway 189 in the cold tube sheet 181. A plate 190 is provided to maintain pressure on the packing material 184 in the oversized tapered holes 186 of the cold tube sheet 181.

In operation, a heating medium is passed around the outer tubes 72 in much the same manner as described with reference to Figure 4 and a cooling medium is introduced through bayonet tubes 80 for passage therethrough until it reaches the bottom of the inner tubes 74 whereafter the cooling medium ascends between the bayonet tubes 80 and the inner tubes 71 for final discharge by way of the header 191. A fraction separated by thermal diffusion and entering the product chamber 187 is withdrawn from the apparatus by way of passageway 189.

Longitudinal expansion of the outer tubes 72 and the shell 20a are compensated for by expansion joint 182. Longitudinal expansion and contraction of the inner tubes 71 is no problem because the other ends of these tubes are free as shown at the bottom of Figure 4. Lateral movement of hot tube sheet 180 relative to cold tube sheet 181 due to radial expansion of the hot tube sheet 180 and consequent lateral displacement of the outer tubes 72 is compensated for by the packing material 184 maintained in sealing engagement with the exteriors of the inner tubes 71 by the packing plate 190.

Figure 7:
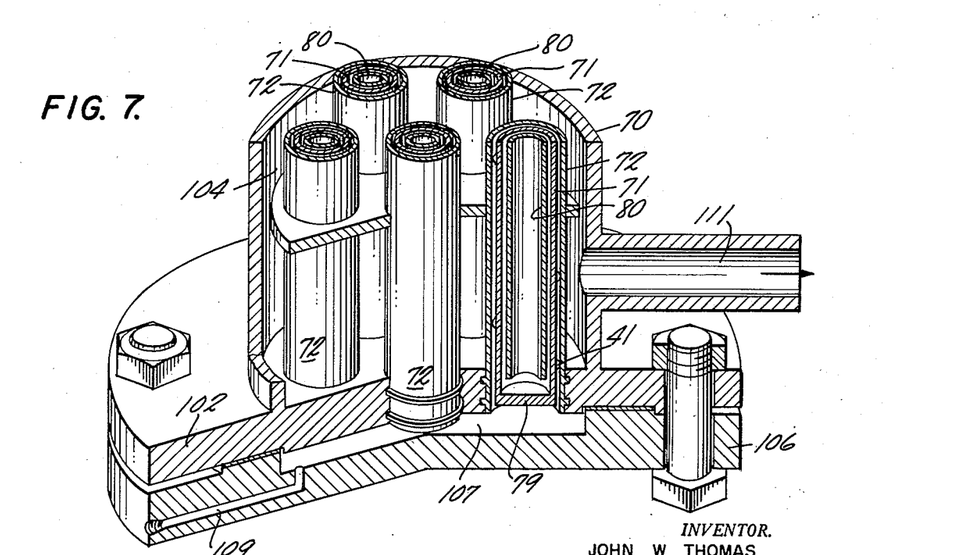
Figure 7 is a similar view of the lower end of the apparatus illustrated in Figure 4.

Figure 14 illustrates an embodiment alternative to that illustrated at the bottom of Figure 4 and in greater detail in Figure 7. The only substantial difference is that the ends of the outer tubes 72 are supported in a floating hot tube sheet 192 rather than the tube sheet 102, shown in Figures 4 and 7, and that the floating tube sheet 192 is secured to the base sheet 106 by an expansion joint 194 for permitting movement of the tube sheet 192 relative to the shell 20a and for sealing the product header 196.

In this embodiment the product separated by thermal diffusion, upon leaving the annular separation chambers 74, passes into the product header 196 and is withdrawn therefrom through passageway 109 in the base sheet 106.

It is to be understood that innumerable modifications of the embodiments specifically illustrated and described herein will suggest themselves to those skilled in the art upon reading this description. All such modifications and alterations, including interchanges and reversals of structures, are intended to be included within the scope of the invention as defined in the accompanying claims.

I claim:

1. Thermal diffusion apparatus comprising a plurality of substantially vertical tube sets, each tube set comprising inner and outer concentric tubes forming between them a narrow annular thermal diffusion separation chamber having upper and lower ends, means for supporting the ends of the outer tubes of said sets in spaced relation to one another, means for supporting the inner tubes of said sets concentrically within their respective outer tubes, first and second headers in communication with the upper and lower ends respectively of the annular separation chambers for introducing liquid into and removing liquid from said chambers, means for relatively heating one of the inner and outer tubes of said tube sets and relatively cooling the other of said inner and outer tubes, and means comprising tube segments fitting within and extending beyond the ends of the inner tubes, opposed surfaces of the tube segments and inner tubes being spaced from each other, and sealing gaskets sealing the spaces between the surfaces, said tube segments and sealing gaskets compensating for differential longitudinal and radial expansion and contraction of the inner and outer tubes and the tube supporting means.

2. Thermal diffusion apparatus comprising a plurality of substantially vertical tube sets, each tube set comprising inner and outer concentric tubes forming between them a narrow annular thermal diffusion separation chamber having upper and lower ends, means for supporting the ends of the outer tubes of said sets in spaced relation to one another, means for supporting the inner tubes of said sets concentrically within their respective outer tubes, first and second headers in communication with the upper and lower ends respectively of the annular separation chambers for introducing liquid into and removing liquid from said chambers, feed control elements for the annular separation chambers for imposing a relatively high pressure drop on liquid within the apparatus and for distributing said liquid equally among said chambers, means for relatively heating one of the inner and outer tubes of said tube sets and relatively cooling the other of said inner and outer tubes, and means comprising tube segments fitting within and extending beyond the ends of the inner tubes, opposed surfaces of the tube segments and inner tubes being spaced from each other, and sealing gaskets sealing the spaces between the surfaces, said tube segments and sealing gaskets compensating for differential longitudinal and radial expansion and contraction of the inner and outer tubes and the tube supporting means.

3. Thermal diffusion apparatus comprising a plurality of substantially vertical tube sets, each tube set comprising inner and outer concentric tubes forming between them a narrow annular thermal diffusion separation chamber having upper and lower ends, means for supporting the ends of the outer tubes of said sets in spaced relation to one another, means for supporting the inner tubes of said sets concentrically within their respective outer tubes, first and second headers in communication with the upper and lower ends respectively of the annular separation chambers for introducing liquid into and removing liquid from said chambers, perforated cylindrical feed control elements in the paths of liquid flowing between one of said headers and the annular separation chambers for imposing a relatively high pressure drop on liquid within the apparatus and for distributing said liquid equally among said chambers, means for relatively heating one of the inner and outer tubes of said tube sets and relatively cooling the other of said inner and outer tubes, and means comprising tube segments fitting within and extending beyond the ends of the inner tubes, opposed surfaces of the tube segments and inner tubes being spaced from each other, and sealing gaskets sealing the spaces between the surfaces, said tube segments and sealing gaskets compensating for differential longitudinal and radial expansion and contraction of the inner and outer tubes and the tube supporting means.

4. Thermal diffusion apparatus comprising a plurality of substantially vertical tube sets, each tube set comprising inner and outer concentric tubes forming between them a narrow annular thermal diffusion separation chamber having upper and lower ends, means for supporting the ends of the outer tubes of said sets in spaced relation to one another, means for supporting the inner tubes of said sets concentrically within their respective outer tubes, first and second headers in communication with the upper and lower ends respectively of the annular separation chambers for introducing liquid into and removing liquid from said chambers, porous cylindrical feed control elements in the paths of liquid flowing between one of said headers and the annular separation chambers for imposing a relatively high pressure drop on liquid within the apparatus and for distributing said liquid equally among said chambers, means for relatively heating one of the inner and outer tubes of said tube sets and relatively cooling the other of said inner and outer tubes, and means comprising tube segments fitting within and extending beyond the ends of the inner tubes, opposed surfaces of the tube segments and inner tubes being spaced from each other, and sealing gaskets sealing the spaces between the surfaces, said tube segments and sealing gaskets compensating for differential expansion longitudinal and radial and contraction of the inner and outer tubes and the tube supporting means.

5. Thermal diffusion apparatus comprising a plurality of substantially vertical tube sets, each tube set comprising inner and outer concentric tubes forming between them a narrow annular thermal diffusion separation chamber having upper and lower ends, means for supporting the ends of the outer tubes of said sets in spaced relation to one another, means for supporting the inner tubes of said sets concentrically within their respective outer tubes, first and second headers in communication with the upper and lower ends respectively of the annular separation chambers for introducing liquid into and removing liquid from said chambers, perforated cylindrical feed control elements in the paths of liquid flowing from one of said headers into the annular separation chambers for imposing a relatively high pressure drop on liquid within the apparatus and for distributing said liquid equally among said chambers, means for relatively heating one of the inner and outer tubes of said tube sets and relatively cooling the other of said inner and outer tubes, and means comprising tube segments fitting within and extending beyond the ends of the inner tubes, opposed surfaces of the tube segments and inner tubes being spaced from each other, and sealing gaskets sealing the spaces between the surfaces, said tube segments and sealing gaskets compensating for differential longitudinal and radial expansion and contraction of the inner and outer tubes and the tube supporting means.

6. Thermal diffusion apparatus comprising a plurality of substantially vertical tube sets, each tube set comprising inner and outer concentric tubes forming between them a narrow annular thermal diffusion separation chamber having upper and lower ends, means for supporting the ends of the outer tubes of said sets in spaced relation to one another, means for supporting the inner tubes of said sets concentrically within their respective outer tubes, first and second headers in communication with the upper and lower ends respectively of the annular separation chambers for introducing liquid into and removing liquid from said chambers, porous cylindrical feed control elements in the paths of liquid flowing from one of said headers into the annular separation chambers for imposing a relatively high pressure drop on liquid within the apparatus and for distributing said liquid equally among said chambers, means for relatively heating one of the inner and outer tubes of said tube sets and relatively cooling the other of said inner and outer tubes, and means comprising tube segments fitting within and extending beyond the ends of the inner tubes, opposed surfaces of the tube segments and inner tubes being spaced from each other, and sealing gaskets sealing the spaces between the surfaces, said tube segments and sealing gaskets compensating for differential longitudinal and radial expansion and contraction of the inner and outer tubes and the tube supporting means.

7. Thermal diffusion apparatus comprising a plurality of substantially vertical tube sets, each tube set comprising inner and outer concentric tubes forming between them a narrow annular thermal diffusion separation chamber having upper and lower ends, tube sheets supporting the outer tubes of said sets in spaced relation to one another at the ends thereof and at a location intermediate said ends, means for supporting the inner tubes of said sets concentrically within their respective outer tubes, a feed header in communication with the annular separation chambers intermediate the ends of the outer tubes, first and second product headers in communication with the upper and lower ends respectively of the annular separation chambers for collecting liquid from said chambers, means for relatively heating the outer tubes of said tube sets and relatively cooling the inner tubes, and means, including a tube segment mounted for limited relative movement within one end of each inner tube, opposed surfaces of each tube segment and inner tube being spaced from each other, and a sealing gasket sealing each said space between the surfaces, said tube segment and sealing gasket compensating for differential longitudinal and radial expansion and contraction of the inner and outer tubes and the tube sheets supporting said tubes.

8. Thermal diffusion apparatus comprising a plurality of substantially vertical tube sets, each tube set comprising inner and outer concentric tubes forming between them a narrow annular thermal diffusion separation chamber having upper and lower ends, tube sheets supporting the outer tubes of said sets in spaced relation to one another at the ends thereof and at a location intermediate said ends, means for supporting the inner tubes of said sets concentrically within their respective outer tubes, a feed header in communication with the annular separation chamber intermediate the ends of the outer tubes, a fixed flow restricting member in the feed header for distributing liquid substantially uniformly through the feed header and to the annular separation chambers, first and second product headers in communication with the upper and lower ends respectively of the annular separation chambers for collecting liquid from said chambers, means for relatively heating the outer tubes of said tube sets and relatively cooling the inner tubes, and means comprising tube segments fitting within and extending beyond the ends of the inner tubes, opposed surfaces of the tube segments and inner tubes being spaced from each other, and sealing gaskets sealing the spaces between the surfaces, said tube segments and sealing gaskets compensating for differential longitudinal and radial expansion and contraction of the inner and outer tubes.

9. Thermal diffusion apparatus comprising a plurality of substantially vertical tube sets, each tube set comprising inner and outer concentric tubes forming between them a narrow annular thermal diffusion separation chamber having upper and lower ends, tube sheets supporting the outer tubes of said sets in spaced relation to one another at the ends thereof and at a location intermediate said ends, means for supporting the inner tubes of said sets concentrically within their respective outer tubes, a feed header in communication with the annular separation chamber intermediate the ends of the outer tubes, perforated cylindrical feed control elements in the feed header and concentric with reference to the inner tubes for imposing a relatively high pressure drop on the feed to distribute the feed equally among and within the individual separation chambers, first and second product headers in communication with the upper and lower ends respectively of the annular separation chambers for collecting liquid from said chambers, means for relatively heating the outer tubes of said tube sets and relatively cooling the inner tubes, and means, including a tube segment mounted for limited relative movement within each end of each inner tube, opposed surfaces of each tube segment and inner tube being spaced from each other, and a sealing gasket sealing each said space between the surfaces, said tube segment and sealing gasket compensating for differential longitudinal and radial expansion and contraction of the inner and outer tubes and the tube sheets supporting said tubes.

10. Thermal diffusion apparatus comprising a plurality of substantially vertical tube sets, each tube set comprising inner and outer concentric tubes forming between them a narrow annular thermal diffusion separation chamber having upper and lower ends, tube sheets supporting the outer tubes of said sets in spaced relation to one another at the ends thereof and at a location intermediate said ends, means for supporting the inner tubes of said sets concentrically within their respective outer tubes, a feed header in communication with the annular separation chamber intermediate the ends of the outer tubes, porous cylindrical feed control elements in the feed header and concentric with reference to the inner tubes for imposing a relatively high pressure drop on the feed to distribute the feed equally among and within the individual separation chambers, first and second product headers in communication with the upper and lower ends respectively of the annular separation chambers for collecting liquid from said chambers, means for relatively heating the outer tubes of said tube sets and relatively cooling the inner tubes, and means, including a tube segment mounted for limited relative movement within each end of each inner tube, opposed surfaces of each tube segment and inner tube being spaced from each other, and a sealing gasket sealing each said space between the surfaces, said tube segment and sealing gasket compensating for differential longitudinal and radial expansion and contraction of the inner and outer tubes and the tube sheets supporting said tubes.

11. Thermal diffusion apparatus comprising a plurality of substantially vertical tube sets, each tube set comprising inner and outer concentric tubes forming between them a narrow annular thermal diffusion separation chamber having upper and lower ends, tube sheets supporting the outer tubes of said sets in spaced relation to one another at the ends thereof and at a location intermediate said ends, means for supporting the inner tubes of said sets concentrically within their respective outer tubes, a feed header in communication with the annular separation chamber intermediate the ends of the outer tubes, first and second product headers in communication with the upper and lower ends respectively of the annular separation chambers for collecting liquid from said chambers, perforated cylindrical feed control elements in the product headers and concentric with reference to the inner tubes for imposing a relatively high pressure drop on the feed to distribute the feed equally among and within the individual separation chambers, means for relatively heating the outer tubes of said tube sets and relatively cooling the inner tubes, and means, including a tube segment mounted for limited relative movement within each end of each inner tube, opposed surfaces of each tube segment and inner tube being spaced from each other, and a sealing gasket sealing each said space between the surfaces, said tube segment and sealing gasket compensating for differential longitudinal and radial expansion and contraction of the inner and outer tubes and the tube sheets supporting said tubes.

12. Thermal diffusion apparatus comprising a plurality of substantially vertical tube sets, each tube set comprising inner and outer concentric tubes forming between them a narrow annular thermal diffusion separation chamber having upper and lower ends, tube sheets supporting the outer tubes of said sets in spaced relation to one another at the ends thereof and at a location intermediate said ends, means for supporting the inner tubes of said sets concentrically within their respective outer tubes, a feed header in communication with the annular separation chamber intermediate the ends of the outer tubes, first and second product headers in communication with the upper and lower ends respectively of the annular separation chambers for collecting liquid from said chambers, porous cylindrical feed control elements in the product headers and concentric with reference to the inner tubes for imposing a relatively high pressure drop on the feed to distribute the feed equally among and within the individual separation chambers, means for relatively heating the outer tubes of said tube sets and relatively cooling the inner tubes, and means, including a tube segment mounted for limited relative movement within each end of each inner tube, opposed surfaces of each tube segment and inner tube being spaced from each other, and a sealing gasket sealing each said space between the surfaces, said tube segment and sealing gasket compensating for differential longitudinal and radial expansion and contraction of the inner and outer tubes and the tube sheets supporting said tubes.

References Cited in the file of this patent

UNITED STATES PATENTS

| | | |
|---|---|---|
| 1,015,180 | Heitman | Jan. 16, 1912 |
| 1,500,286 | Terriault | July 8, 1924 |
| 2,108,087 | Thayer | Feb. 15, 1938 |
| 2,158,238 | Hvid | May 16, 1939 |
| 2,541,069 | Jones et al. | Feb. 13, 1951 |
| 2,653,799 | Stahn et al. | Sept. 29, 1953 |

U. S. DEPARTMENT OF COMMERCE
PATENT OFFICE

CERTIFICATE OF CORRECTION

Patent No. 2,825,463                                                          March 4, 1958

John W. Thomas

It is hereby certified that error appears in the printed specification of the above numbered patent requiring correction and that the said Letters Patent should read as corrected below.

Column 1, line 42, for "difflusion" read --diffusion--; column 11, line 45, strike out "expansion" and insert the same after "radial", same line.

Signed and sealed this 22nd day of April 1958.

(SEAL)
Attest:

KARL H. AXLINE
Attesting Officer

ROBERT C. WATSON
Commissioner of Patents